(12) United States Patent
Grimm et al.

(10) Patent No.: US 7,747,626 B2
(45) Date of Patent: Jun. 29, 2010

(54) SEARCH RESULTS CLUSTERING IN TABBED BROWSERS

(75) Inventors: Richard Grimm, Redmond, WA (US); Gregory D. Finch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 418 days.

(21) Appl. No.: 11/668,958

(22) Filed: Jan. 30, 2007

(65) Prior Publication Data

US 2008/0184137 A1      Jul. 31, 2008

(51) Int. Cl.
   *G06F 7/00* (2006.01)
(52) U.S. Cl. .................................. 707/737; 707/712
(58) Field of Classification Search .............. 707/1–10, 707/101, 705–713, 721–722, 731–732, 738–740; 705/14, 64; 709/208; 713/157; 715/513
   See application file for complete search history.

(56) References Cited

U.S. PATENT DOCUMENTS 7,349,913 B2 *   3/2008   Clark et al. ................. 707/101

2004/0049737 A1 *   3/2004   Hunt et al. ................... 715/513
2005/0210118 A1 *   9/2005   Hickman et al. ............. 709/208
2005/0216421 A1 *   9/2005   Barry et al. .................... 705/64
2006/0100788 A1 *   5/2006   Carrino et al. ................ 702/19
2007/0073580 A1 *   3/2007   Perry et al. .................... 705/14
2007/0250705 A1 *   10/2007   Smith et al. ................. 713/157

FOREIGN PATENT DOCUMENTS

| KR | 1020040082275 | 9/2004 |
| KR | 1020050077242 | 8/2005 |
| KR | 1020060050397 | 5/2006 |

OTHER PUBLICATIONS

International Search Report with Written Opinion dated Apr. 8, 2008.

* cited by examiner

*Primary Examiner*—Wilson Lee
(74) *Attorney, Agent, or Firm*—Shook, Hardy & Bacon L.L.P.

(57) ABSTRACT

Search results can be clustered into useable groups and provided to a user. The search results can be categorized according to a clustering algorithm associated with a search engine. The clustered search results can be categorized and provided into separate tabs for each category. In another aspect, multiple tab windows can automatically be opened which allows the user to operate simultaneously multiple tab windows whereby the inputs in one tab window provides results in another tab window.

13 Claims, 3 Drawing Sheets

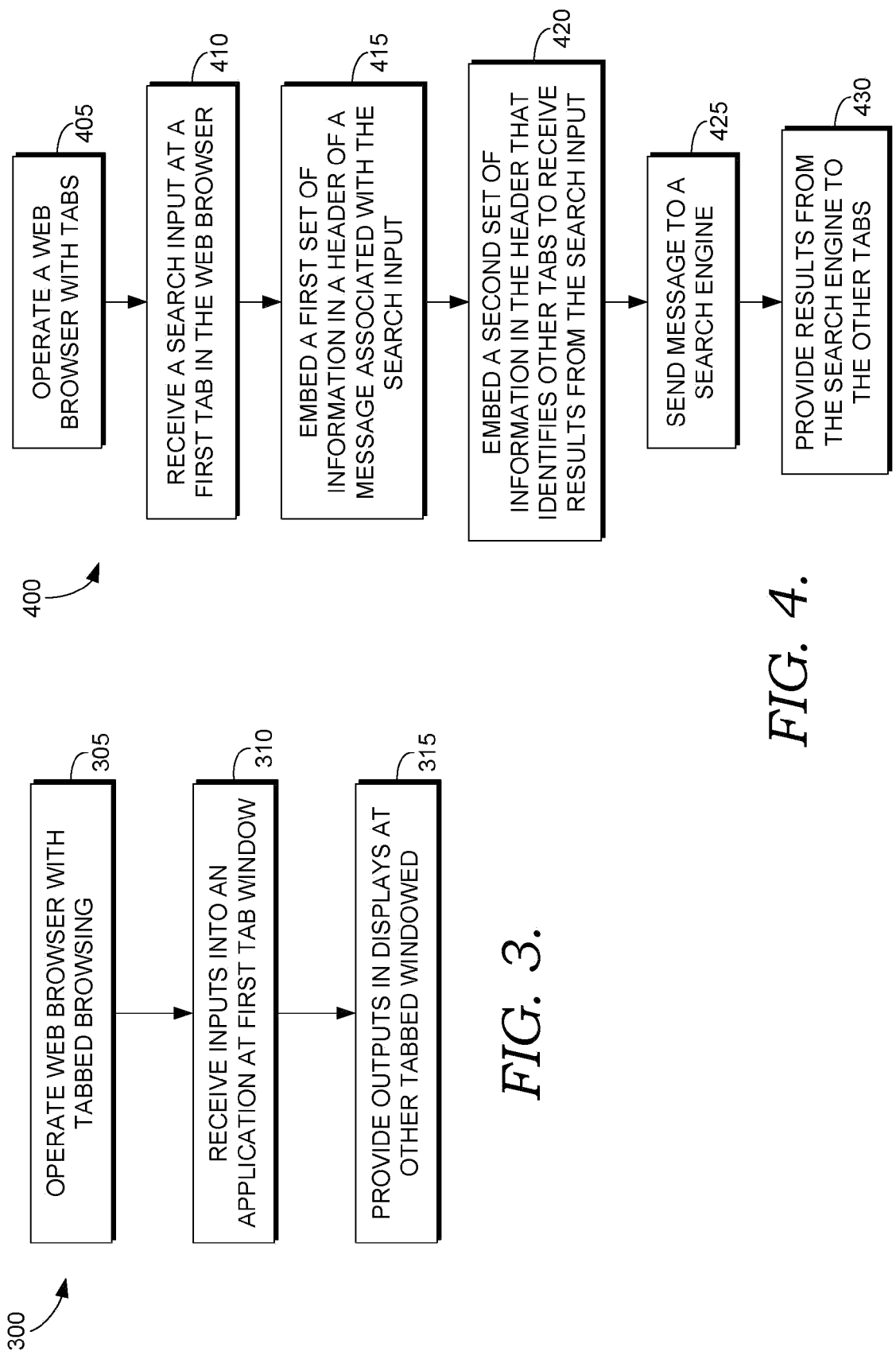

SEARCH RESULTS CLUSTERING IN TABBED BROWSERS

CROSS-REFERENCE TO RELATED APPLICATIONS

Not applicable

STATEMENT REGARDING FEDERALLY SPONSORED RESEARCH OR DEVELOPMENT

Not applicable.

BACKGROUND

One of the biggest complaints with search engines is that they present a few categories of results such as "sponsored links" and "non-sponsored links." If a user looks for information on a particular product, the user may not find the information. For example, the user might find useful having the search results grouped into categories such as manufacturers web pages, shopping websites, product review websites, and discussion groups, to name a few. If the search engine returned the links grouped into categories, the user may easily find the information that is desired.

Today, websites are displayed in a single browser window. In tabbed web browsers, the website is displayed in a single tab. When the user clicks a link, the content of the current tab or browser window is replaced. Alternatively, a second tab or browser window might be opened if the proper setting are established or the proper client script is executed. The browser experiences are confined to the singe browser window or tab, or additional browser windows or tabs if the user clicks the correct links or establishes the right settings.

With a combination of the experiences of the prior two paragraphs, the user may find using a search engine in a tabbed browsing environment very cumbersome. The user's frustration should be reduced by making it easier to obtain search results, especially in a tabbed web browser environment.

SUMMARY

The Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The disclosure describes, among other things, a medium, method, and system for clustering search results in tabbed windows of a web browser. The various solutions are summarized below.

Embodiments of the present invention cover creating search results that are useful to a user and providing separate categories of clustered results into separate tabs. A search input may be provided to a search engine. The search engine can implement a clustering algorithm that can group several types of search results from the search input. The clustered search results may be provided into tabs in a tabbed window environment where each cluster is displayed in a separate tab.

BRIEF DESCRIPTION OF THE SEVERAL VIEWS OF THE DRAWINGS

The present invention is described in detail below with reference to the attached drawing figures, which are incorporated herein by reference, and wherein:

FIG. 3 is a flowchart of an exemplary process for clustering search results in tabbed windows when implementing an embodiment of the present invention; and FIG. 4 is a flowchart of an exemplary process for clustering search results and communicating between tabbed browsing windows when implementing an embodiment of the present invention.

DETAILED DESCRIPTION

The present invention will be better understood from the detailed description provided below and from the accompanying drawings of various embodiments of the invention, which describe, for example, a medium, method, and system for clustering search results in tabbed windows of a web browser. The detailed description and drawings, however, should not be read to limit the invention to the specific embodiments. Rather, these specifics are provided for explanatory purposes that help the invention to be better understood.

Exemplary Operating Environment

Figure 1:
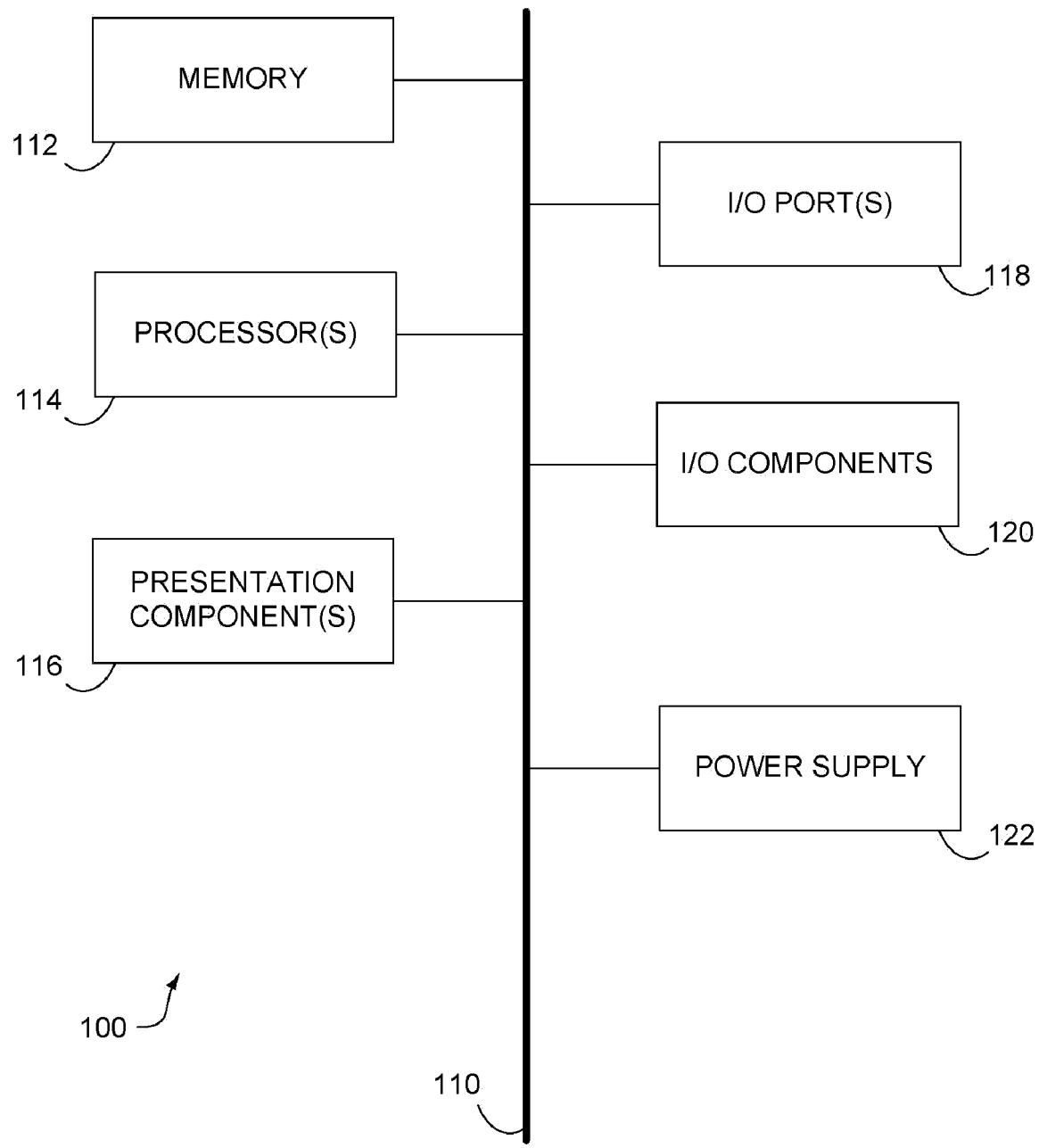
FIG. 1 is an exemplary operating environment suitable for practicing an embodiment of the present invention.

Referring to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including hand-held devices, consumer electronics, general-purpose computers, more specialty computing devices, etc.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art and reiterate that the diagram of FIG. 1 is merely illustrative of an exemplary computing device that can be used in connection with one or more embodiments of the present invention. Distinction is not made between such categories as "workstation," "server,"

"laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD); magnetic cassettes, magnetic tape, magnetic disk storage or other magnetic storage devices, or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Many different arrangements of the various components depicted, as well as components not shown, are possible without departing from the spirit and scope of the present invention. Embodiments of the present invention will be described with the intent to be illustrative rather than restrictive. Alternative embodiments will become apparent to those skilled in the art that do not depart from its scope. A skilled artisan may develop alternative means of implementing improvements without departing from the scope of the present invention.

To help explain the invention without obscuring its functionality, an embodiment will now be referenced. Although the present invention can be employed in connection with a computing-network environment, it should not be construed as limited to the exemplary applications provided here for illustrative purposes.

Search Results Clustering and Multiple Browser Windows

In a first aspect, a media containing thereon computer-readable code for clustering search results in tabbed windows of a web browser is provided that includes operating the web browser with a tabbed browsing capability. Inputs are received into an application or a service at a first browser window in the web browser. Outputs are provided in displays respectively at other browser windows in the web browser.

In a second aspect, a method for communicating between tabbed browsing windows in a web browser is provided that includes operating a web browser with tabbed browsing windows. From a tabbed browsing window, a message is sent to a server for a specific action. Information is embedded in the message to target other tabbed browsing windows. At the targeted other tabbed browsing windows, results are received from the server based on the specific action. The targeted other tabbed browsing windows are created if not existing already in the web browser.

In yet another aspect, a system for clustering search results and communicating between tabbed browsing windows are provided that includes a web browser operable with tabs. A search input is received at a first tab in the web browser. A first set of information is embedded in a header of a message associated with the search input that identifies the first tab. A second set of information is embedded in the header of the message associated with the search input that identifies other tabs to receive results from the search input. The message is sent to a search engine in a server. The server reads the search input and the header, and directs the results from the search engine to the other tabs in the web browser.

Figure 2:
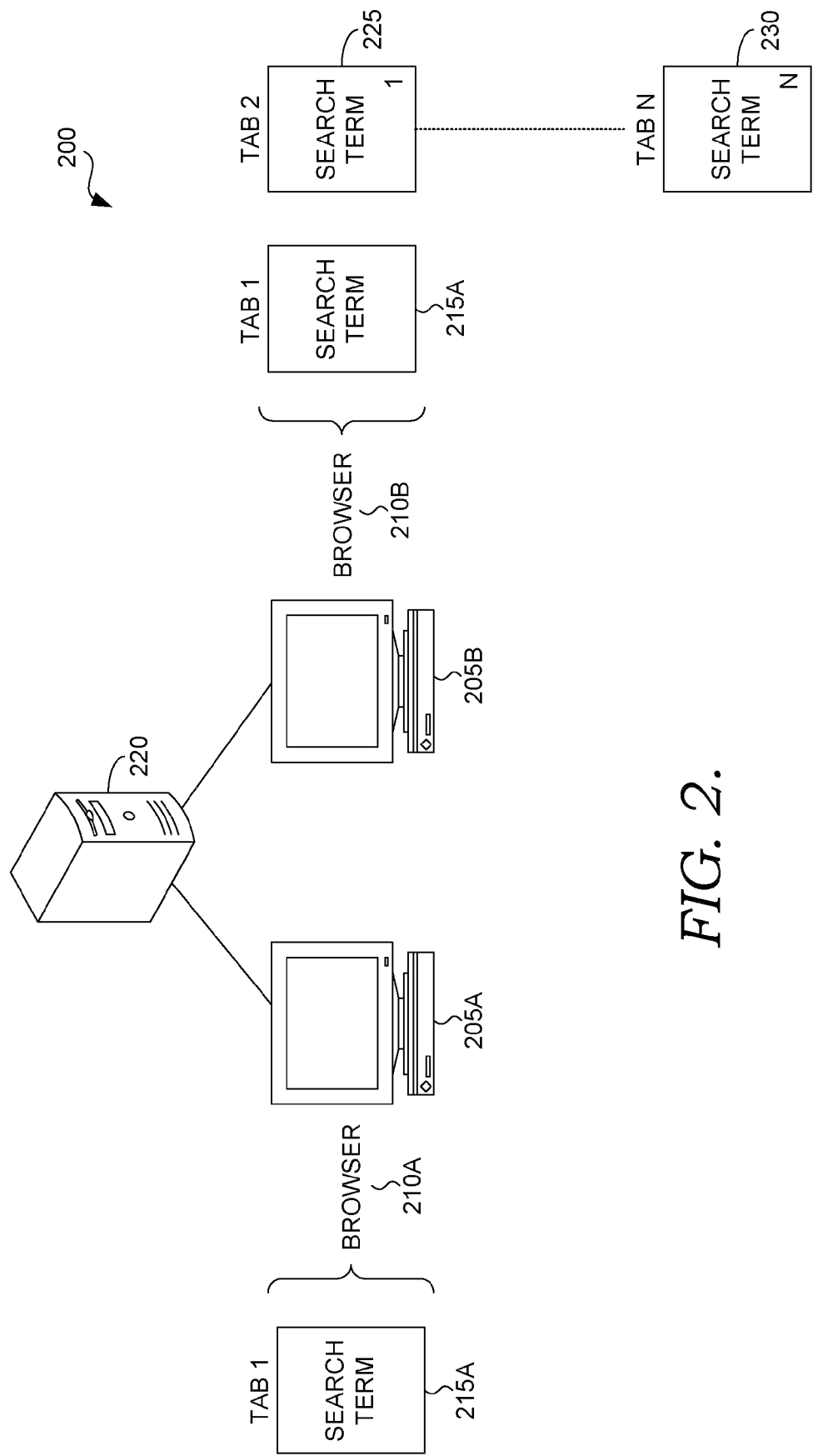
FIG. 2 is a block diagram illustrating the clustering of search results into separate tabs when practicing an embodiment of the present invention.

In FIG. 2, an exemplary operating environment 200 is shown with a computing device 205A operating with a web browser 210A. Web browser 210A has a capability of providing multiple browser windows. With web browser 210A, a tab window 215A may be displayed and can receive a search term provided by a user operating computing device 205A. The search term is sent over a network connection to a server 220.

Server 220 can include a search engine or another computer program to create a set of results. In particular, the search engine can include a clustering algorithm that categories the results according to a set of rules to help the user at computing device 205A. For example, the user may submit a search term and the search engine provides search results categorized into groups such as manufacturer websites, shopping websites, product review websites, and discussion groups, to name a few. Although not discussed here, the clustering algorithm may be pre-arranged with inputs from an implementer so that the search results are useful to the user. Whereas one type of search input can yield a set of categories. Another type of search input may yield a different set of categories even though the same search engine and clustering algorithm are used.

Server 220 returns search results to a computing device 205B which is actually the same computing device 205A. However, in computing device 205B search results are displayed in a web browser 210B which has several tabs identified as tab windows 215A, 225, and 230. Web browser 210B is web browser 210A with additional tabs and search results. As shown in FIG. 2, the search results are provided in tab windows 225 and 230. Based on the results of the clustering algorithm in the search engine, the categorized results may be provided in a number of tabs. These tabs are dynamic and may change depending on the results provided from server 220.

The illustration of FIG. 2 shows a time sequence of events using the same devices. For example, computing devices 205A and 205B are the same except for when the search input is provided and when the search results are received. The same is true for web browsers 210A and 210B. In a first time sequence, the search input is provided in one tab. In another time sequence, the search input remains the same in the tab but is accompanied with other tabs containing search results. In both cases, the same computing device and web browser are used.

In a scenario of an embodiment of the present invention, a user goes online to a search website where they type a string of keywords for the search engine (server 220). The keywords include the name of a known company and a product model number. The search engine finds the appropriate links and then clusters the links into categories. In a first category, the company's website is provided with related information about the product. In a second category, review websites are provided where the product has been reviewed. In a third category, shopping websites are provided where the product is for sale. In a fourth category, discussion or forum websites are provided where the product is mentioned. In a fifth category, "my favorite" websites are provide where the product is mentioned. The categories are provided to the user by displaying each category in a separate tab window web browser (tab windows 225 and 230). Therefore, the user has the first tab (tab window 215A) where the string of keywords were provided and the subsequent tabs (tab windows 225 and 230) with the category of search results.

Although FIG. 2 is illustrated using search terms that yield search results, an embodiment of the present invention may be implemented using other inputs that yield other results from server 220. For example, tab window 215A may include a metric conversion algorithm that takes the inputs of an English measurement and provides the metric results in tab windows 225 and 230.

In another scenario, a word processor or document editor becomes an AJAX-enabled application. A user visits a website containing the word processor or document editor. Upon visiting the website, two tab windows are automatically opened in the user's web browser. The first tab contains the document editor and the second tab contains contextually-relevant search results that pertain to the document that is written. Because of AJAX, search terms may be generated on-the-fly in the first tab, uploaded to a search engine, and the search engine may provide search results downloaded automatically to the second tab. The movement of search terms and search results may be handled via XMLHttpRequests attributes.

Turning now to FIG. 3, a process for clustering search results in tabbed windows is provided in a method 300. In a step 305, a web browser operates at a computing device with tabbed browsing. A user may open a single tab window (215A) or multiple tab windows in the web browser (210A). In a step 310, inputs are received into an application at a first tab window. The application can be a search engine, document editor, or a conversion program as discussed above, but is not limited to these applications. The inputs are provided to a server 220 and outputs, in the form of results, are provided in displays at other tabbed windows in a step 315.

In FIG. 4, a process for clustering search results and communicating between tabbed browsing windows are provided in a method 400. In a step 405, a web browser 210A operates with tabs. In a step 410, a search input is received at a first tab (215A) in the web browser 210A. In a step 415, a first set of information is embedded in a header of a message associated with the search input. The header may be an HTTP header with an HTTP request which enables a web page to make requests and get responses from a server like server 220. The header may also be included in an XMLHttpRequest which allows the web page to make requests and get responses from the server without reloading the web page.

In a step 420, a second set of information is embedded in the header of the message that identifies other tabs to receive results from the search input. In a step 425, the message is sent to a search engine in server 220. In a step 430, server 200 sends, from the search engine, results to the other tabs identified as tab windows 225 and 230.

The prior discussion is for illustrative purposes to convey exemplary embodiments. The steps discussed in FIG. 4 may be executed without regards to order. Some steps may be omitted and some steps may be executed at a different time than shown. For example, step 420 may be executed before step 415. The point here is to convey that the figures are merely exemplary for the embodiments of the present invention and that other embodiments may be implemented. It will be understood that certain features and sub-combinations are of utility and may be employed without reference to other features and sub-combinations and are contemplated within the scope of the claims.

As shown in the above scenarios, the present invention may be implemented in various ways. From the foregoing, it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A system with a computing device and a server, each having a processor and memory, for clustering search results and communicating between tabbed browsing windows, comprising:

a web browser in the computing device that operates with one or more tabs;

a search input received at a first tab in the web browser;

a first set of information embedded in a header of a message associated with the search input, the first set of information identifies the first tab;

a second set of information embedded in the header of the message associated with the search input, the second set of information identifies one or more different tabs in the web browser to receive one or more results from the search input, the one or more different tabs and the first tab are located together in the web browser; and the message sent to a search engine in the server wherein the server reads the search input and the header, and directs the one or more results from the search engine to the one or more different tabs in the web browser, the one or more results are clustered together into one or more categories wherein each category is a set of related search results, each of the one or more categories is respectively displayed in each of the one or more different tabs in the web browser.

2. The system of claim 1, wherein the header is selected from a group including an HTTP header.

3. The system of claim 1, further comprising modifying the one or more results in the one or more different tabs, which modifies a content in the first tab.

4. A method for communicating between tabbed browsing windows in a web browser wherein all steps are performed by one or more computing devices, comprising:

operating a web browser in a computing device with one or more tabbed browsing windows;

from a tabbed browsing window, sending a message to a server for a specific action by the server;

embedding a set of information in the message that is sent to the server, the set of information in the message instructs the server to target one or more other tabbed browsing windows in the computing device when one or more results are received, the one or more other tabbed browsing windows are different from the tabbed browsing window; and receiving, at the targeted one or more other tabbed browsing windows in the computing device, the one or more results from the server based on the specific action by the server, the one or more results are clustered together into one or more specific categories, each of the one or more specific categories are displayed respectively in each of the targeted one or more other tabbed browsing windows, the targeted one or more other tabbed browsing windows are created if not existing already in the web browser.

5. The method of claim 4, wherein embedding the set of information comprises embedding the set of information in an HTTP header to direct the one or more results to the one or more other tabbed browsing windows.

6. The method of claim 5, wherein sending the message comprises sending a search term to the server wherein the server includes a search engine.

7. The method of claim 6, wherein the message includes the HTTP header and the search term bundled together.

8. The method of claim 6, wherein the one or more results are selected from a group including one or more search results.

9. The method of claim 4, further comprising modifying the one or more results in the targeted one or more other tabbed browsing windows to modify a content in the tabbed browsing window.

10. One or more computer storage media containing thereon computer-readable code for clustering search results in tabbed windows of a web-browser, when executed by a processor, performing a method comprising:
   operating the web browser with a tabbed browsing capability;
   receiving a search query at a first browser window in the web browser;
   sending the search query to a search engine at a server wherein the search engine creates results and clusters the results into one or more unique outputs;
   receiving the one or more unique outputs at the web browser; and
   displaying each of the one or more unique outputs respectively in one or more unique browser windows in the web browser wherein the one or more unique browser windows are different from the first browser window and wherein the one or more unique browser window and the first browser window have tabs for selection in the web browser.

11. The media of claim 1, wherein providing the one or more unique outputs, comprises:
   grouping the one or more unique outputs into one or more different results; and
   providing each of the one or more different results respectively into each of one or more displays wherein at least a number of the one or more unique browser windows is based on a number of the one or more different results.

12. The media of claim 11, wherein the one or more different results are created based on a clustering algorithm associated with the search engine.

13. The media of claim 12, wherein the one or more different results are selected from a group including manufacturer websites, shopping websites, product review websites, and discussion groups.

* * * * *